US005409633A

United States Patent [19]

Clements et al.

[11] Patent Number: 5,409,633

[45] Date of Patent: Apr. 25, 1995

[54] BLEACH COMPOSITION

[75] Inventors: Anthony H. Clements, Wrexham, United Kingdom; Colin W. Kerr, Piacenza, Italy; John R. Nicholson, Ramsey, N.J.

[73] Assignee: Lever Brothers Company, Division of Conopco, Inc., New York, N.Y.

[21] Appl. No.: 122,835

[22] Filed: Sep. 15, 1993

[30] Foreign Application Priority Data

Sep. 16, 1992 [EP] European Pat. Off. .......... 92308431

[51] Int. Cl.$^6$ .......... C01B 15/10

[52] U.S. Cl. .......... 252/186.42; 252/186.38; 252/186.26; 252/95; 562/2; 8/111

[58] Field of Search .......... 252/186.22, 186.26, 252/186.42, 95

[56] References Cited

U.S. PATENT DOCUMENTS

| | | | |
|---|---|---|---|
| 4,100,095 | 7/1978 | Hutchins et al. | 252/99 |
| 4,134,850 | 1/1979 | McCrudden et al. | 252/186.26 |
| 4,331,570 | 5/1982 | Klemarczyk et al. | 424/48 |
| 4,824,591 | 4/1989 | Dyroff et al. | 252/94 |
| 4,917,811 | 4/1990 | Foster et al. | 252/95 |

FOREIGN PATENT DOCUMENTS

| | | |
|---|---|---|
| 0037136 | 10/1981 | European Pat. Off. . |
| 0068547 | 1/1983 | European Pat. Off. . |
| 0106584 | 4/1984 | European Pat. Off. . |
| 0267175 | 5/1988 | European Pat. Off. . |
| 0435379 | 7/1991 | European Pat. Off. . |
| 1456591 | 11/1976 | United Kingdom . |

OTHER PUBLICATIONS

EP Search Report EP 93 30 7279.

EP Search Report EP 92 30 8431.

WO91/18876.

CA:86(23):170703z, "*Homolytic Substitution Reactions, IV, Stereochemical Study of the Thermal Decarboxylation of Peracids with Bicyclic Structures*", Gruselle et al.

CA78(19):124781k, "*Quinoline Alkaloids, XIV Asymmetric Synthesis by the Peroxy-Acid-Olefin Reactin. ect*", Bowman et al. Univ. of Belfast, N. Ire., 1973.

CA72(9):42913s, "*Preparation of Some Optically Active Peracids*", Friel et al., Queen's University, BelFast, N. Ireland, 1969.

CA91(13):107610e, "*Electron Spin Resonance Study of Pyramidal Geometry around the Tervalent Carbon Atom of the bicyclo [2.1.1]Hexan-5-yl radical*", Kawamura et al. 1979.

CA87(1):4882h "*A long-range isotope effect on a HFSC (Hyperfine Splitting Constant) of the bicyclo [2.1.1] bieyan-5-yl-radical*", Kawamura et al., Kyoto Univ., 1977.

*Primary Examiner*—Gary Geist
*Assistant Examiner*—Joseph D. Anthony
*Attorney, Agent, or Firm*—Milton L. Honig

[57] ABSTRACT

The invention relates to bleach compositions containing, as the bleach, a hydrophobic peroxyacid which is sterically bulky, so that the smallest cross-sectional area of the peroxyacid, defined by multiplying together the two smallest dimensions of the molecule, is from 30 to 80 Å$^2$. Preferred are peroxyacids containing a tertiary alkyl group, a norbornane ring or an adamantone ring. Such peroxyacids are effective for the bleaching of stains, especially hydrophobic stains, with low accompanying dye damage.

4 Claims, No Drawings

BLEACH COMPOSITION

TECHNICAL FIELD

The present invention relates to the use of an organic peroxyacid for the bleaching of stains, to bleach compositions comprising a peroxyacid and to a process of washing fabrics with such a peroxyacid.

BACKGROUND

An important trend in washing and bleaching practices in household and industry has been the move towards lower wash and bleaching temperatures, i.e. below 60° C. In turn, this trend towards lower temperature bleaching has necessitated improvement in the bleaching performance of detergent compositions, particularly with respect to the stain removal of bleachable stains and soilings, such as tea, wine, coffee, blackberry juice etc., the so-called dingy soils and hydrophobic stains like seafood dressing and tomato sauce/olive oil. Organic peroxyacids as a class are quite effective bleaches and the use of organic peroxyacid compounds as the bleach system in detergent compositions has been proposed in the art, sea for example GB-A-1,456,591 and U.S. Pat. No. 4,100,095.

A recent trend in clothing is the wearing and the appreciation by consumers of coloured fabrics. However, washing of these fabrics creates problems when they are stained. These stained fabrics may be washed with the conventional peroxyacids to remove the stains, but this will result in the fabrics losing colour. On the other hand, coloured fabrics can be washed with detergent compositions without bleach, but this will result in poor stain removal after washing.

These problems are more apparent when the fabrics are soiled with hydrophobic stains. Hydrophobic stains are frequently encountered and are often regarded as difficult to remove, e.g. collar and cuff stains, sweat and sebum. A hydrophobic peroxyacid bleach is therefore highly desirable in order to counteract these types of stains. One particular problem with hydrophobic peroxyacids, however, is the dye damage they can cause on coloured fabrics, especially nylon, acetate and tri-acetate fabrics.

Consequently, a problem exists in washing of stained coloured fabrics, especially when hydrophobically stained, without the fabrics losing colour.

EP-A-267165 discloses peroxy acids which incorporate sulphone groups which are relatively polar and add hydrophilic character to the compounds which incorporate them. This document states (page 3 lines 3 to 5) that some sulphone peroxycarboxylic acids exhibit a low level of damage to dyes in coloured articles. Separately in this document it is stated that "the tendency to cause dye damage will vary but will usually be reduced by the presence of one or more sulphone groups". A variety of peroxycarboxylic acids are disclosed in this prior document, including some norbornyl compounds.

THE INVENTION

We have now found that bulky peroxyacids can bleach stains, without substantially affecting the colours of the fabric, even when sulphone groups are absent so that the bleach is more hydrophobic, which is valuable for efficacy against hydrophobic stains.

In a first aspect this invention provides the use in bleach or detergent compositions for fabrics, as a colour-care bleach for bleaching with low concomitant dye damage, of an organic peroxyacid whose smallest cross-sectional area, defined as the product of the smallest two orthogonal dimensions, is from 30 to 80 Å$^2$ and which is sufficiently hydrophobic that it has a log P of 0.3 to 4.5 (where P is its octanol-water partition coefficient).

Generally, the organic peroxyacid will not contain any sulphone group. Thus in a second aspect this invention provides the use, as a colour-care bleach, of an organic peroxyacid which is free of sulphone groups and whose smallest cross-sectional area is from 30 to 80 Å$^2$.

Organic peroxyacids of appropriate bulk include acids which contains at least eight carbon atoms and incorporate a tertiary alkyl group or a bi-cyclic or tricycloaliphatic group. The use of such acids is also an aspect of this invention.

A further aspect of this invention is a bleach composition comprising, as a bleaching agent, an organic peroxyacid whose smallest cross-sectional area, defined as the product of the smallest two orthogonal dimensions, is from 30 to 80 Å$^2$ and which is sufficiently hydrophobic that it has a log P of 0.3 to 4.5.

In a yet further aspect, the invention provides a process for cleaning fabrics with sterically bulky peroxyacids as defined above.

DETAILED DESCRIPTION

Without wishing to be bound by any theory, it is believed that by choosing peroxyacids with the right bulkiness or steric size, the rate of diffusion of the peroxyacid in fabrics, such as nylon, tri-acetate and di-acetate fabrics, is lowered whereas the diffusion in stains remains at the same rapid rate, which results in good stain bleaching while the colour of the fabrics is not substantially affected.

An indication of the bulkiness of the molecule is the smallest cross-sectional area. The smallest cross-sectional area may be measured by using molecular graphics that are drawn with the Chem-X system developed and distributed by Chemical Design Ltd, Oxford, England. The molecular dimensions in three orthogonal dimensions are measured, and the smallest cross-sectional area is the product of multiplying the two smallest values. The cross-sectional areas of some molecules as measured by this method are shown in Table I of Example I.

Preferably, the peroxyacids of the invention will have hydrophobicity expressed as $\log_{10}$ P of from 0.3–4.5, wherein P represents the octanol-water partition coefficient. This can conveniently be a calculated value determined by using the Med Chem Programme from Pomona College Medicinal Chemistry Project, Seaver Chem. Lab., Claremont, Calif. The upper limit of hydrophobicity is constrained by the need for solubility of the peroxyacid, and is set at a $\log_{10}$ P of 4.5. The lower limit is set at 0.3, preferably 1.0, and more preferably 1.5.

The effectiveness of peroxyacids is dependent on the electrophilic reactivity, which is indicated by its pKa (the dissociation constant). Preferably, the peroxyacid of the invention has a pKa of from 7–9.

For the purposes of this invention, the pKa can be determined using the following method. Sodium hydroxide (0.001N or 0.01 molar) was added to 150 ml of peroxyacid solution ($10^{-4}$ to $10^{-3}$ molar) and the pH plotted until final pH of 10 was reached. The pKa value was calculated according to the method described in 'H. T. S. Britton "Hydrogen Ions", Vol 1, Chapman and Hall, p. 217–218.

Peroxyacid compounds falling within the definition of the invention include for example p-t-butylperbenzoic acid, and peroxy-3,5,5-trimethylhexanoic acid (isopernonanoic acid).

Preferred organic peroxyacids include bi- or tricycloaliphatic groups such as norbornyl and adamantyl groups in which there is at least one pair of rings which share more than two carbon atoms. Such preferred peroxyacid compounds can be represented by the general formula:

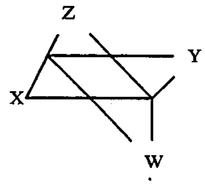

(I)

wherein:

W is a $C_1$–$C_4$ alkylene group, a direct bond or is absent,
each X, Y is a $C_2$–$C_4$ alkylene group, and
Z is a $C_1$–$C_4$ alkylene group,
each of W, X, Y and Z optionally (but preferably not) including olefinic unsaturation if containing at least two carbon atoms; and

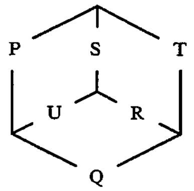

(II)

wherein:

each of P, Q, R, S, T, U=$C_1$–$C_2$ alkylene, or represents a direct bond, or is absent, with the proviso that not more than 2 groups either represent direct bonds or are absent, said compound being substituted with 1 to 3 —$CO_3H$ or —$RCO_3H$ sidegroups and other sidegroups selected from —H, —OR, —Cl, —Br, —F, —$NO_2$, —R, and —$CONR_2$, wherein R is a $C_1$–$C_4$ alkyl or alkylene group.

A preferred class within the group of bi-cycloaliphatic peroxyacid compounds is represented by the general formula:

bicyclo [a.b.c] alkyl peroxyacid wherein:

a, b, c=1–4,
a+b+c≧5, and
alkyl=$C_7$–$C_{14}$,
said compound being substituted with 1 to 3 —$CO_3H$ sidegroups and the other sidegroups selected from —H, —OR, —Cl, —Br, —$NO_2$, —R, and $CONR_2$, with R selected from $C_1$–$C_4$. Peroxyacids according to the invention may for example consist of a ring of 6 to 8 Carbon atoms. Preferably a+b+c=5.

Especially preferred are bicyclo [2.2.1] heptane peroxyacid compounds having 1 to 3 $CO_3H$ groups substituted on the basic ring structure which is:

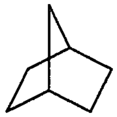

The side groups thereon may be independently chosen from —H, —$CO_3H$, —$CH_3$ and —$CH_2CO_3H$, with the proviso that at least one —$CO_3$ group is present. The —$CO_3H$ peroxyacid groups may be attached to any of the positions in the molecule.

More specifically, the following compounds in cis or trans, endo or exo, (+) or (−) form, are particularly suitable for use in the present invention: 3-methyl-norbornane-2-peroxyacid, 2-norbornane-peroxy-acetic-acid, 2-methylnorbornane-2-peroxyacid, norbornane-2-peroxyacid, 3-methylnorbornane-2-peroxyacid, 2-norbornane-peroxyacetic-acid, norbornane-2,3-diperoxyacid, norbornane-2,3-diperoxyacid, norbornane-1-peroxyacid and norbornane-2-peroxyacid.

A useful class within the group of tri-cycloaliphatic peroxyacids is that of adamantoic peroxyacids whose basic structure is:

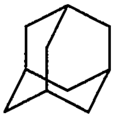

This is substituted with 1 to 3 —$CO_3H$ sidegroups, and other sidegroups are selected from —H, —OR, —Cl, —Br, —F, —$NO_2$, —R, and —$CONR_2$, R being selected from $C_1$–$C_4$ alkyl or alkylene groups.

A preferred example of this class of adamantoic-peroxyacids is adamantoic-1-peroxyacid.

Peroxyacids of the invention cover a wide range of peroxyacid compounds having configurations of the side groups in the endo, exo, trans, cis, (+) and (−) forms and mixtures thereof in one molecule and use thereof in a composition.

The peroxyacids may be presented in the acid or salt form and they may be generated from a precursor in situ in a wash liquor. Examples of suitable precursors are esters or amides of norbornane acids.

In bleaching compositions, the peroxyacid according to the invention can be present in amounts of from 0.05–70%, preferably from 0.5–60%, more preferably from 0.7–55% and most preferably from 1–50% by weight of the composition.

colour-caring

As explained an advantage of the peroxyacids as herein before described is that they are colour-caring, i.e. colour-safe, or colour friendly. A measure for this colour-safety is the rate of dye-damage. For the purpose of this invention, dye damage is determined by way of the following method.

The difference in reflectance of coloured cloths before and after washing with a bleach, optionally with a detergent base, is determined. This is also determined without using bleach, optionally with a detergent base, as the control. The difference in reflectances, measured at a wavelength of 640 nm using a Beckman Grating Spectrophotometer, is an indication of the dye damage that is caused by the bleach. The reflectance is measured and the reflectance measurements (R) were converted to K/S values according to the equation:

$$K/S=(1-R)^2/2R;$$

whereafter the dye damage can be determined with the following equation:

$$\%\ \text{dye damage}=(K/Si-K/Sb)/(K/Si-K/So)\times 100,$$

wherein:

R is the reflectance fraction, i.e. % Reflectance/100;
K is the light absorption coefficient and
S is light-scattering coefficient, as described in Kubelka and Munk Zeitschrift. Tech. Physik. 12, 593 (1931);
the suffix 1 denotes dyed fabric before washing;
the suffix b denotes dyed fabric after washing in peroxyacid solution; and
the suffix o denotes non-fluorescent white nylon.

The stain bleaching performance was measured by determining the difference (Delta R460) in % reflectance of cloths at 460 nm before and after washing.

The dye damage caused by the peroxyacids according to the present invention, at a concentration of 0.000525 moles/1, can be less than 20%, more preferably less than 15%, most preferably less than 10%.

Normally, the bleaching composition will also contain a surfactant material.

SURFACTANT MATERIAL

The surface-active material may be naturally derived, such as soap, or a synthetic material selected from anionic, nonionic, amphoteric, zwitterionic, cationic actives and mixtures thereof. Many suitable actives are commercially available and are fully described in literature, for example in "Surface Active Agents and Detergents", Volumes I and II, by Schwartz, Perry and Berch.

Typical synthetic anionic surface-actives are usually water-soluble alkali metal salts of organic sulphates and sulphonates having alkyl radicals containing from about 8 to about 22 carbon atoms, the term alkyl being used to include the alkyl portion of higher aryl radicals.

Examples of suitable synthetic anionic detergent compounds are sodium and ammonium alkyl sulphates, especially those obtained by sulphating higher ($C_8$–$C_{18}$) alcohols produced, for example, from tallow or coconut oil; sodium and ammonium alkyl ($C_9$–$C_{20}$) benzene sulphonates, particularly sodium linear secondary alkyl ($C_{10}$–$C_{15}$) benzene sulphonates; sodium alkyl glyceryl ether sulphates, especially those esters of the higher alcohols derived from tallow or coconut oil and synthetic alcohols derived from petroleum; sodium coconut oil fatty acid monoglyceride sulphates and sulphonates; sodium and ammonium salts of sulphuric acid esters of higher ($C_9$–$C_{18}$) fatty alcohol alkylene oxide, particularly ethylene oxide, reaction products; the reaction products of fatty acids such as coconut fatty acids esterified with isethionic acid and neutralized with sodium hydroxide; sodium and ammonium salts of fatty acid amides of methyl taurine; alkane monosulphonates such as those derived by reacting alpha-olefins ($C_8$–$C_{20}$) with sodium bisulphite and those derived by reacting paraffins with $SO_2$ and $C_{12}$ and then hydrolysing with a base to produce a random sulphonate; sodium and ammonium $C_7$–$C_{12}$ dialkyl sulphosuccinates; and olefin sulphonates, which term is used to describe the material made by reacting olefins, particularly $C_{10}$–$C_{20}$ alpha-olefins, with $SO_3$ and then neutralizing and hydrolysing the reaction product. The preferred anionic detergent compounds are sodium ($C_{10}$–$C_{15}$) alkylbenzene sulphonates, sodium ($C_{16}$–$C_{18}$) alkyl sulphates and sodium ($C_{16}$–$C_{18}$) alkyl ether sulphates.

Examples of suitable nonionic surface-active compounds which may be used, preferably together with the anionic surface-active compounds, include in particular the reaction products of alkylene oxides, usually ethylene oxide, with alkyl ($C_6$–$C_{22}$) phenols, generally 5-25 EO, i.e. 5-25 units of ethylene oxides per molecule; the condensation products of aliphatic ($C_8$–$C_{18}$) primary or secondary linear or branched alcohols with ethyleneoxide, generally 2-30 EO, and products made by condensation of ethylene oxide with the reaction products of propylene oxide and ethylene diamine. Other so-called nonionic surface-actives include alkyl polyglycosides, sugar esters, long-chain tertiary amine oxides, long-chain tertiary phosphine oxides and dialkyl sulphoxides.

Amounts of amphoteric or zwitterionic surface-active compounds can also be used in the compositions of the invention but this is not normally desired owing to their relatively high cost. If any amphoteric or zwitterionic detergent compounds are used, it is generally in small amounts in compositions based on the much more commonly used synthetic anionic and nonionic actives.

As stated above, amounts soaps may also be incorporated in the compositions of the invention, preferably at a level of less than 25% by weight. They are particularly useful at low levels in binary (soap/anionic) or ternary mixtures together with nonionic or mixed synthetic anionic and nonionic compounds. Soaps which are used are preferably the sodium, or, less desirably, potassium salts of saturated or unsaturated $C_{10}$–$C_{24}$ fatty acids or mixtures thereof. The amount of such soaps can be varied between about 0.5% and about 25% by weight, with lower amounts of about 0.5% to about 5% being generally sufficient for lather control. Amounts of soap between about 2% and about 20%, especially between about 5% and about 10%, are used to give a beneficial effect on detergency. This is particularly valuable in compositions used in hard water when the soap acts as a supplementary builder.

The surfactant is present in an amount of from 0.4 to 80.0%, preferably from 0.8 to 75%, more preferably from 1.0 to 70% by weight of the composition.

The composition of the invention may also further and preferably contain:

(i) Hydrophilic Bleaches

The peroxyacids of the present invention may be used in combination with a peroxygen bleach or a precursor-peroxygen system. Combinations like these will result in the hydrophilic bleach bleaching the hydrophilic stains and the hydrophobic bleach the hydrophobic stains without substantially affecting the colours. Further, there is no need for washing twice to remove all stains.

The peroxygen compounds are normally compounds which are capable of yielding hydrogen peroxide in aqueous solution. Hydrogen peroxide sources are well known in the art. They include the alkali metal peroxides, organic peroxides such as urea peroxide, and inorganic persalts, such as the alkali metal perborates, percarbonates, perphosphates, persilicates and persulphates. Mixtures of two or more such compounds may also be suitable. Particularly preferred are sodium perborate tetrahydrate and, especially, sodium perborate monohydrate. Sodium perborate monohydrate is preferred because of its higher active oxygen content. Sodium percarbonate may also be preferred for environmental reasons.

Alkylhydroxy peroxides are another class of peroxygen compounds. Examples of these materials include cumene hydroperoxide and t-butyl hydroperoxide.

Organic peroxyacids may also be suitable for use herein as hydrophilic bleach.

All these peroxygen compounds may be utilized alone or in conjunction with a peroxyacid bleach precursor.

Peroxyacid bleach precursors are known and amply described in literature, such as in the GB Patents 836,988; 864,798; 907,356; 1,003,310 and 1,519,351; German Patent 3,337,921; EP-A-0185522; EP-A-0174132; EP-A-0120591; and U.S. Pat. Nos. 1,246,339; 3,332,882; 4,128,494; 4,412,934 and 4,675,393.

Another useful class of peroxyacid bleach precursors is that of the quaternary ammonium substituted peroxyacid precursors as disclosed in U.S. Pat. Nos. 4,751,015 and 4,397,757, in EP-A-284292 and EP-A-331,229. Examples of peroxyacid bleach precursors of this class are: 2-(N,N,N-trimethyl ammonium) ethyl sodium-4-sulphophenyl carbonate chloride—(SPCC); N-octyl, N,N-dimethyl-N10-carbophenoxy decyl ammonium chloride—(ODC); 3-(N,N,N-trimethyl ammonium) propyl sodium-4-sulphophenyl carboxylate; and N,N,N-trimethyl ammonium toluyloxy benzene sulphonate.

Any one of these peroxyacid bleach precursors can be used in the present invention, though some may be more preferred than others. Of the above classes of bleach precursors, the preferred classes are the esters, including acyl phenol sulphonates and acyl alkyl phenol sulphonates; acyl-amides; and the quaternary ammonium substituted peroxyacid precursors. Highly preferred peroxyacid bleach precursors or activators include sodium-4-benzoyloxy benzene sulphonate (SBOBS); N,N,N',N'-tetraacetyl ethylene diamine (TAED); sodium-1-methyl-2-benzoyloxy benzene-4-sulphonate; sodium-4-methyl-3-benzoyloxy benzoate; SPCC trimethyl ammonium toluyloxy benzene sulphonate; penta acetyl glucose (PAG) and benzoyl tetracetyl glucose.

These precursors may be used in an amount of about 1–8%, preferably from 2–5% by weight, in a detergent composition.

As further improvement the composition may also additionally include a bleach catalyst such as the manganese-complexes and copper-ions as disclosed in EP 458,397/EP 458,938 and/or an organic bleach catalyst of the sulfonimine type as described in EP 446,982 and EP 453,002.

(ii) Enzymes

The proteolytic enzymes which are suitable for use in the present invention are normally solid, catalytically active protein materials which degrade or alter protein types of stains when present as in fabric stains in a hydrolysis reaction. They may be of any suitable origin, such as vegetable, animal, bacterial or yeast origin.

Proteolytic enzymes or proteases of various qualities and origins and having activity in various pH ranges of from 4–12 are available and can be used in the composition of the present invention. Examples of suitable proteolytic enzymes are the subtilisins which are obtained from particular strains of *B. subtilis* and *B. licheniformis*, such as the commercially available subtilisins Maxatase®, as supplied by Gist-Brocades, N.V., Delft, Holland, and Alcalase®, as supplied by Novo Industri A/S, Copenhagen, Denmark.

Particularly suitable is a protease obtained from a strain of Bacillus having maximum activity throughout the pH range of 8–12, being commercially available, e.g. from Novo Industri A/S under the registered trade names Esperase® and Savinase®. The preparation of these and analogous enzymes is described in British Patent Specification 1,243,784.

Other examples of suitable proteases are pepsin, trypsin, chymotrypsin, collagenase, keratinase, elastase, papain, bromelin, carboxypeptidases A and B, aminopeptidase and aspergillopeptidases A and B.

The amount of proteolytic enzymes normally used in the composition of the invention may range from 0.001% to 10% by weight, preferably from 0.01% to 5% by weight, depending upon their activity. They are generally incorporated in the form of granules, prills or "marumes" in an amount such that the final washing product has proteolytic activity of from about 2–20 Anson units per kilogram of final product.

Other enzymes, such as cellulases, lipases, cellulases and amylases, may also be used in addition to proteolytic enzymes as desired.

(iii) Detergency Builders

Builder materials may be selected from 1) calcium sequestrant materials, 2) precipitating materials, 3) calcium ion-exchange materials and 4) mixtures thereof.

Examples of calcium sequestrant builder materials include alkali metal polyphosphates, such as sodium tripolyphosphate; nitrilotriacetic acid and its water-soluble salts; the alkali metal salts of carboxymethyloxy succinic acid, ethylene diamine tetraacetic acid, oxydisuccinic acid, mellitic acid, benzene polycarboxylic acids, citric acid; and polyacetal carboxylates as disclosed in U.S. Pat. Nos. 4,144,226 and 4,146,495.

Examples of precipitating builder materials include sodium orthophosphate, sodium carbonate and long-chain fatty acid soaps.

Examples of calcium ion-exchange builder materials include the various types of water-insoluble crystalline or amorphous aluminosilicates, of which zeolites are the best known representatives, such as Zeolite (4) A, zeolite B or P, zeolite X, and also zeolite MAP (maximum aluminium P) as described in EP-A-384,070 (Unilever).

In particular, the compositions of the invention may contain any one of the organic or inorganic builder materials, such as sodium or potassium tripolyphosphate, sodium or potassium pyrophosphate, sodium or potassium orthophosphate, sodium carbonate, the sodium salt of nitrilotriacetic acid, sodium citrate, carboxymethyl malonate, carboxymethyloxy succinate and the water-insoluble crystalline or amorphous aluminosilicate builder materials, or mixtures thereof.

These builder materials may be present at a level of, for example, from 5 to 80% by weight, preferably from 10 to 60% by weight.

OTHER OPTIONAL INGREDIENTS

These are specific ingredients which are optionally and preferably included to give additional benefits and/or for aesthetical reasons.

Examples of these additives include lather boosters, such as alkanolamides, particularly the monoethanol amides derived from palmkernel fatty acids and coconut fatty acids, lather depressants, such as alkyl phosphates and silicones, anti-redeposition agents, such as sodium carboxymethyl cellulose and alkyl or substituted alkyl cellulose ethers, stabilizers, such as the various organic phosphonates known under the Trade name "Dequest" and ethylene diamine tetraacetic acid, fabric softening agents, inorganic salts, such as sodium sulphate, and, usually present in very small amounts, fluorescent agents, perfumes, enzymes, such as proteases, cellulases, lipases and amylases, germicides, dye transfer inhibitors such as PVP and PVA and colourants.

FABRICS

The peroxyacids according to the present invention can be used in a process of washing fabrics. The term "fabrics" used herein includes fibres, textiles and fabrics of both animal and vegetable origins, synthetics and mixtures thereof, such as cottons, mercerised cotton, cellulosics, wool and other protein fibres, bast fibres, viscose, polyester, acrylic, nylon, tri-acetate and di-acetate. The invention is of especial importance to coloured cotton, nylon and acetate fabrics.

SYNTHESES OF THE PEROXYACID COMPOUNDS

The peroxyacids according to the invention can be prepared in a number of ways, e.g. as described in the J. Chem. Soc. 1968, 1317, Tetrahedron 198, 36, 1023 and in the J. Chem. Soc. Perkin Trans. II, 1986, 781 and in Tetrahedron 1985, 41, 4237.

A particularly effective route which may be employed for the synthesis of substituted norbornaneper-carboxylic acids can be summarised as follows.

Dicyclopentadiene is heated with an α,β-unsaturated acid to 160° C. in the presence of iron filings for several hours, and extracted into alkali. As α,β-unsaturated acid may for example be chosen Acrylic acid, Crotonic acid, Methacrylic acid, Fumaric acid, Maleic acid, Mesaconic acid and Itaconic acid. Acidification and extraction into chloroform allowed isolation of the substituted norborn-5-ene-2-carboxylic acid. The process of heating dicyclopentadiene to 160° C. in the presence of iron filings results in the formation of the unstable cyclopentadiene, which then undergoes a Diels Alder [4+2] cycloaddition with the α,β-unsaturated acid to generate the bicyclic product. The cycloaddition reaction usually proceeds predominantly via endo addition but sometimes a mixture of 2 products, resulting from endo and exo addition is generated. Prevention of exo-formation can be established in a number of ways:

1. adding a Lewis acid catalyst (e.g. titanium tetrachloride)
2. performing the reaction on a solid support (e.g. silica) in the absence of solvent
3. using a chiral titanium alkoxide catalyst in the presence of 4 Å molecular sieves
4. using molecular aggregation techniques
5. using an acetylene derivative as the dienophile to give a substituted norbornadiene which could be stereospecifically hydrogenated to yield the endo product.

The unsaturation may be readily removed by hydrogenation over palladium-on-charcoal in absolute ethanol, giving the saturated acid.

The conversion of the acid to peroxyacid may be carried out using methanesulphonic acid as solvent in an ice bath. High strength (85%) hydrogen peroxide (five fold excess per acid group) was added dropwise with temperature monitoring and the mixture was stirred at room temperature for several hours. Work-up yielded the peroxyacid, in most cases as a colourless oil, although norbornane-2-percarboxylic acid was a white solid.

DETERGENT COMPOSITION

The composition of the invention is preferably a detergent composition and may be presented in any product form such as powders, granules, pastes and liquids.

The peroxyacid of the present invention can also be incorporated in detergent additive products. Such additive products are intended to supplement or boost the performance of conventional detergent compositions and may contain any of the components of such compositions, although they will not comprise all of the components present in a fully formulated detergent composition.

In another embodiment, the peroxyacid of the invention can be suitably incorporated in a product that can be used for direct application purposes.

The following examples will facilitate the understanding of the present invention. The dye damage in the following experimental procedures was determined as indicated above.

EXAMPLE I

The cross-sectional area can be calculated by determining the dimensions of the peroxyacid with molecular graphics that are drawn with the Chem-X system developed and distributed by Chemical Design Ltd Oxford, England. The area is obtained by multiplying the two smallest dimensions in perpendicular directions.

TABLE I

MEASURING CROSS-SECTIONAL AREA OF PEROXYACID MOLECULES

| Peroxyacid | Dimensions in Å | Cross-sectional area in $Å^2$ |
|---|---|---|
| 2-norbornane peracetic | 10.5 × 5.8 × 6.2 | 36.0 |
| Peradamantoic | 9.3 × 6.3 × 6.6 | 41.6 |
| n-pernonanoic | 12.3 × 4.5 × 4.9 | 22.0 |
| p-$bu^t$ perbenzoic | 11.4 × 6.0 × 6.0 | 36.0 |
| p-$bu^n$ perbenzoic | 13.7 × 6.2 × 3.9 | 24.2 |
| perbenzoic | 9.5 × 6.0 × 3.1 | 18.6 |

EXAMPLE II 500 ml of peroxyacid solution (0.000525 moles/l) plus EDTA (0.012 g/l) was thermostatted at 22°-24° C. A 25 ml aliquot was withdrawn for iodometric titration immediately before the addition of 3.25 g of blue disperse dyed nylon (9×approx 50 mm squares). The cloths were mechanically stirred in the solution for 30 minutes and then removed, rinsed with demineralised water and dried. The experiments were replicated and control experiments conducted to correct for any peroxyacid decomposition occurring during the 30 minutes.

TABLE II

| PEROXYACID | Smallest Cross sectional area ($Å^2$) | % dye damage | $Log_{10}P$ | pKa |
|---|---|---|---|---|
| 2 methylnorbornane-endo-2-percarboxylic | 53.0 | 5.6 | 2.07 | 8.2 |
| Norbornane-endo-2-Percarboxylic | 46.4 | 7.0 | 1.55 | 8.15 |
| Trans-3-Methyl norbornane-endo-2-percarboxylic | 51.0 | 8.2 | 2.07 | 8.15 |

TABLE II-continued

| PEROXYACID | Smallest Cross sectional area ($Å^2$) | % dye damage | $Log_{10}P$ | pKa |
|---|---|---|---|---|
| Exo-2-Norbornane-peracetic | 36.0 | 8.6 | 2.17 | 8:12 |
| Peradamantoic | 41.6 | 11.2 | 2.43 | 7.95 |
| p-$Bu^t$ Perbenzoic | 36.0 | 19.6 | 3.86 | 7.98 |
| p-$Bu^n$ Perbenzoic | 24.2 | 39.6 | 4.12 | 8.0 |
| Perbenzoic | 18.6 | 26.0 | 1.88 | 7.78 |

This example shows the excellent anti-dye-damaging results that are obtained with the peroxyacids according to the invention.

EXAMPLE III

The dye damaging effects of n-pernonanoic acid and 2-norbornane peracetic acid were determined. For this purpose a detergent base (4 g/l) and Dequest 2041 (1 ml of 5.4% solution) were added to 450 ml of 18° FH water in a tergotometer thermostatted at 40° C. Peroxyacid was added to give a concentration of $9.2\times10^{-4}$ mole/l. The pH adjusted to the appropriate value (6 to 10). Eight (5×5 cm) pieces of blue disperse dyed nylon (ca. 3 g) were added and washed at 100 rpm for 30 minutes. The cloths were rinsed thoroughly and dried. Reflectance measurements were performed on the cloths before and after washing and the % dye damage was determined. n-pernonanoic acid, with a smallest cross-sectional area of $22.0A^2$, a log P of 3.47 and pKa of 8.1, was compared with 2-norbornane peroxyacetic acid, a compound according to the present invention.

TABLE III

| | % DYE DAMAGE | |
|---|---|---|
| pH | N-PERNONANOIC ACID | 2-NORBORNANE PERACETIC ACID |
| 6 | 70.4 | 41.1 |
| 7 | 67.9 | 41.7 |
| 8 | 63.7 | 30.7 |
| 9 | 37.2 | 9.3 |
| 10 | 15.0 | 4.8 |

This example shows the superior anti-dye-damaging effect of 2-norbornane-peracetic acid in the pH range 6–10.

EXAMPLE IV

The results shown in the following table were obtained by using the same method as in Example II.

TABLE IV

| PEROXYACID | % DYE DAMAGE |
|---|---|
| DPDA (diperoxydodecanedioic acid) | 30.6 a) |
| trans-norbornane-2,3-diperoxyacid | 4.7 b) |
| cis-norbornane-2,3-diperoxyacid | 2.1 c) |

a) Initial Active oxygen = $2,5\times10^{-4}$ g atoms/l. This solution was obtained by dissolving DPDA at ca. pH 10, followed by addition of $H_2SO_4$ to lower the pH to ca. 4 and filtration.
b) Initial Active oxygen = $5.85\times10^{-4}$ g atoms/l
c) Initial Active oxygen = $4.8\times10^{-4}$ g atoms/l This experiment again illustrates the beneficial effect on dye damage of the peroxyacids of the invention as compared to DPDA.

EXAMPLE V

In a round-robin experimental design the stain bleaching performance of two sterically hindered hydrophobic peroxyacids, norbornane 2-peroxyacid and peradamantoic, was compared to that of perbenzoic acid against a base powder control. This was carried out in a tergotometer at 40° C., washing for 30 minutes. Cloths were washed in 450 ml 18° FH water with 1.8 g NSPA base powder and peroxyacid included at $9.2\times10^{-4}$ mol $l^{-1}$. Two series of experiments were carried out; one at pH 6 where the peracid is largely in its undissociated form and one above the peracid pKa, at pH 9. A stained piece of fabric measuring 8×8 cm was cut into four such that each quarter would be washed under one of each of the four experimental conditions.

To show the beneficial stain bleaching effect of the peroxyacids according to the invention, a comparison was made with Perbenzoic acid through a visual assessment of black biro stained cloths (three replicates) at pH of 6 and 9 (a score of 1 representing the smallest and a score of 4 representing the greatest cleaning benefits).

TABLE V

Washes pH 6:

| Compound: | Base | < | NBC | < | PBA | < | PAD |
|---|---|---|---|---|---|---|---|
| Ranking: | 1 | | 2 | | 3 | | 4 |

TABLE VI

Washes at pH 9:

| Compound: | Base | < | PBA | < | NBC | < | PAD |
|---|---|---|---|---|---|---|---|
| Ranking: | 1.27 | | 1.3 | | 2 | | 4 |

Base = commercially available detergent base
NBC = Norbornane 2-peroxyacid
PBA = Perbenzoic acid
PAD = Peradamantoic acid At pH 6 and pH 9, Peradamantoic acid is the best performer. NBC is third best at a pH of 6 and second best at a pH of 9. At pH 9 there are only relatively small differences between the base control and perbenzoic and norbornane 2-peroxyacids. Peradamantoic acid comes through very strongly as being the best performer, with almost complete removal of the stain, both at pH 6 and 9.

These results show the effectiveness of Norbornane 2-peroxyacid at higher pH and also the effectiveness of peradamantoic acid at removing of what is considered to be a very difficult stain.

EXAMPLE VI

The method as in example V was used in determining the tea stain bleaching effect of sterically hindered hydrophobic peroxyacids, the differences being that 3 replicates were used, the reflectance was measured before and after washing, tests were done over a pH range of from 6 to 10 and 4 g/l NSPA base powder was used.

TABLE VII

TEA STAIN BLEACHING BY STERICALLY HINDERED HYDROPHOBIC PEROXYACIDS ΔR460NM

| | pH | | | | |
|---|---|---|---|---|---|
| PEROXYACID | 6 | 7 | 8 | 9 | 10 |
| 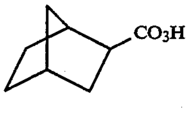 | 9.3 | 12.4 | 14.9 | 12.8 | 5.1 |

TABLE VII-continued

| TEA STAIN BLEACHING BY STERICALLY HINDERED HYDROPHOBIC PEROXYACIDS ΔR460NM | pH | | | | |
|---|---|---|---|---|---|
| PEROXYACID | 6 | 7 | 8 | 9 | 10 |
| 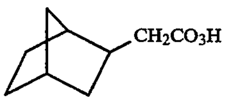 | 12.3 | 16.2 | 16.8 | 12.8 | 6.5 |
| 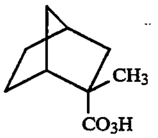 | — | 12.8 | 15.0 | 13.3 | 9.1 |
| 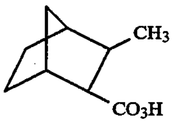 | 7.8 | 11.7 | 12.9 | 8.3 | 4.5 |
| 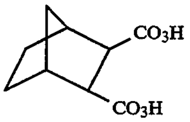 | — | 14.1 | 13.1 | 6.7 | 3.1 |
| Peradamantoic acid | 13.2 | 16.9 | 17.3 | 13.1 | 3.6 |

Values of $\log_{10}$ P, pKa and smallest cross-sectional area for some of these acids can be found in Table II above. The value of $\log_{10}$ P for the diacid

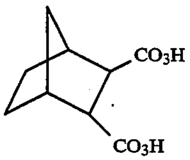

is 0.57.

This example shows that the bleaches according to the invention do not only show good dye damage performance, but good stain-bleaching performance as well.

Similar results may be obtained when norbornane-1-peroxyacid, Norbornane-2-peroxyacid, trans-3-methylnorbornane-endo-2-peroxyacid, 2-methylnorbornane-endo-2-peroxyacid, trans-norbornane-2,3-diperoxyacid, cis-Norbornane-endo-2,3-diperoxyacid, endo-2-methyl-trans-norbornane-2,3-diperoxyacid, 2-methyl-cis-norbornane-endo-2,3-diperoxyacid, 2-percarboxymethyl-norbornane-endo-2-peroxyacid or exo-2-norbornaneperacetic acid are used.

EXAMPLE VII

A procedure similar to Example III was used to compare the dye damaging effects of n-pernonanoic acid and peroxy-3,5,5-trimethylhexanoic acid (so-called iso-pernonanoic acid).

Properties of the two acids are:

| | Smallest Cross-sectional area | $\log_{10}$ P | pKa |
|---|---|---|---|
| n-pernonanoic | 22Å$^2$ | 3.47 | 8.1 |
| iso-pernonanoic | 36Å$^2$ | 3.21 | 8.1 |

Concentrations, temperature and washing time were the same as in Example III. The pH was adjusted to 9. Three types of fabric were used, all dyed with the same dye: CI disperse 14.

The results obtained were:

| | % dye damage | |
|---|---|---|
| Fabric type | n-pernonanoic acid | iso-pernonanoic acid |
| nylon 6,6 | 52 | 11 |
| triacetate | 85 | 23 |
| diacetate | 82 | 25 |

It can be seen that the iso-pernonanoic acid leads to a considerable reduction in dye damage compared with that caused by the straight chain acid.

We claim:

1. A method for bleaching fabrics without substantially affecting fabric color, the method comprising laundering a fabric in a wash liquor containing an effective amount for bleaching of a peroxyacid selected from the group consisting of 3-methylnorbornane-2-peroxyacid, 2-norbornane-peroxy-acetic-acid, 2-methylnorbornane-2-peroxyacid, norbornane-2-peroxyacid, norbornane-2,3-diperoxyacid, and norbornane-1-peroxyacid.

2. A method according to claim 1 wherein said wash liquor further contains an effective amount to clean of a surfactant.

3. A bleach composition comprising:

(i) from 0.5 to 60% by weight of a peroxyacid selected from the group consisting of 3-methylnorbornane-2-peroxyacid, 2-norbornane-peroxy-acetic-acid, 2-methylnorbornane-2-peroxyacid, norbornane-2-peroxyacid, norbornane-2,3-diperoxyacid, and norbornane-1-peroxyacid; and (ii) from 0.4 to 80% by weight of a surfactant.

4. A composition according to claim 3 further comprising from 5 to 80% by weight of a detergency builder.

* * * * *